United States Patent [19]
Tamai

[11] Patent Number: 5,828,202
[45] Date of Patent: Oct. 27, 1998

[54] BATTERY APPARATUS

[75] Inventor: Mikitaka Tamai, Tsuna-gun, Japan

[73] Assignee: Sanyo Electric Co., Ltd., Osaka, Japan

[21] Appl. No.: 807,465

[22] Filed: Feb. 27, 1997

[30]     Foreign Application Priority Data

| Feb. 29, 1996 | [JP] | Japan | ................................. 8-042640 |
| Apr. 17, 1996 | [JP] | Japan | ................................. 8-095455 |
| Jun. 24, 1996 | [JP] | Japan | ................................. 8-163225 |

[51] Int. Cl.$^6$ .................................................. H02J 7/00
[52] U.S. Cl. ........................ 320/141; 320/134; 320/139; 320/146; 320/164
[58] Field of Search .................................... 320/141, 139, 320/146, 164, 128, 132, 134, 135, 136, DIG. 13

[56]                References Cited

U.S. PATENT DOCUMENTS

| 5,397,974 | 3/1995  | Tamai et al. ............................ 320/164 |
| 5,477,124 | 12/1995 | Tamai ....................................... 320/135 |
| 5,477,130 | 12/1995 | Hashimoto et al. ..................... 320/164 |
| 5,493,197 | 2/1996  | Eguchi et al. ........................... 320/134 |
| 5,526,215 | 6/1996  | Hagashima et al. ..................... 361/85 |
| 5,530,336 | 6/1996  | Eguchi et al. ........................... 320/134 |
| 5,547,775 | 8/1996  | Eguchi et al. ........................... 320/118 |
| 5,557,192 | 9/1996  | Tamai ....................................... 320/164 |
| 5,568,039 | 10/1996 | Fernandez ................................ 320/150 |
| 5,574,358 | 11/1996 | Garrett .................................... 320/276 |
| 5,654,622 | 8/1997  | Toya et al. .............................. 320/134 |
| 5,705,911 | 1/1998  | Tamai ....................................... 320/134 |
| 5,747,969 | 5/1998  | Tamai ....................................... 320/141 |

FOREIGN PATENT DOCUMENTS

| 2-119539 | 7/1990 | Japan . |
| 6-113474 | 4/1994 | Japan . |

*Primary Examiner*—Peter S. Wong
*Assistant Examiner*—K. Shin
*Attorney, Agent, or Firm*—Wenderoth, Lind & Ponack, L.L.P.

[57]            ABSTRACT

The battery apparatus has a circuit to turn off a switching device and suspend charging when rechargeable battery voltage exceeds a specified voltage, and to turn on the switching device and resume charging when rechargeable battery voltage drops below the specified voltage. The switching device is switched on and off to pulse charge the rechargeable battery. When cut-off of charging voltage to the rechargeable battery is detected, an over-ride circuit forces the switching device on, or a forced discharge circuit discharges the rechargeable battery until battery voltage drops below the specified voltage.

28 Claims, 13 Drawing Sheets

BATTERY APPARATUS

BACKGROUND OF THE INVENTION

This invention relates to an apparatus capable of pulse charging a rechargeable battery.

Without exception, lithium ion rechargeable batteries house internal protection circuitry. A protection circuit prevents battery voltage from becoming abnormally high during battery charging. To do this, the protection circuit contains a switching device which suspends charging when battery voltage exceeds a specified voltage. When battery voltage drops below the specified voltage, the switching device is switched to the on state allowing the battery to be charged.

Incidentally, constant current charging followed by constant voltage charging is the standard method of charging a lithium ion rechargeable battery. In this method, a battery is charged by constant current until a specified battery voltage (for example, 4.20V) is reached. After the specified voltage is reached, charging is switched to constant voltage charging at the specified voltage to avoid battery voltage rise in excess of the specified value. This method allows charging time to be reduced by increasing the current during constant current charging. However, increasing the charging current too much, increases chances of battery performance degradation. Consequently, maximum charging current is limited to a value that will not induce battery performance degradation.

Pulse charging, which repeatedly charges and suspends charging, has been developed as a method to increase charging current without degrading battery performance (Japanese Non-examined Patent Publication No. 6-113474 issued Apr. 22, 1994. In this method, initial charging is constant current charging until battery voltage rises to a first voltage (for example, 4.40V). Next, constant voltage charging at the first voltage and suspension of charging are repeatedly alternated in a pulse charging phase. Finally, constant voltage charging at a second voltage (4.20V), lower than the first voltage, fully charges the battery after completion of pulse charging.

In the pulse charging phase of this charging method, charging is performed at a first voltage which is greater than the fully charged rechargeable battery voltage. However, since charging and suspension of charging are repeatedly alternated, battery performance degradation is prevented. Furthermore, charging time can be reduced because charging is performed at the first voltage which is greater than the second voltage.

The present applicant further developed a pulse charging method wherein battery voltage is measured during periods of suspended charging, charging is suspended until battery voltage drops to a specified voltage, and charging is resumed once battery voltage drops below the specified voltage (Japanese Patent Application HEI 7-92470 (1995)). As shown by the battery voltage and charging current variation of FIG. 1, periods of suspended charging become longer as the rechargeable battery approaches full charge. This is because battery voltage drops more slowly in a rechargeable battery near full charge. Consequently, full charge can be determined by measuring the length of time charging is suspended.

In this charging method, pulse charging is produced by battery voltage control led on-off switching of a switching device in a protection circuit connected in series with the rechargeable battery. As a result, rechargeable battery charging can be performed with an extremely simple charging circuit. The protection circuit turns the switching device off to suspend charging when battery voltage becomes greater than the specified voltage. During the period of suspended charging when battery voltage drops below the specified voltage, the switching device is turned on and charging is resumed. In this manner, the protection circuit switching device turns on and off to produce pulse charging.

However, if, for example, a battery pack housing rechargeable batteries is removed from the battery charger when the switching device is off, the equipment that the battery attaches to and the battery capacity indicator may function improperly. This is because, as shown in FIG. 2, when the battery pack 3 is attached to electrical equipment and the FET switching device 2 of the protection circuit 1 is off, the battery discharges through the FET switching device 2 parasitic diode 4. The internal resistance of the parasitic diode 4 is not zero, and when current flows through it a voltage drop of 0.6V is developed across its terminals. Therefore, the output voltage of the battery pack 3 is reduced by 0.6V equivalent to the parasitic diode 4 voltage drop. Supply of this voltage to the electrical equipment and circuits such as the battery capacity indicator result in the above mentioned improper function.

The present invention was developed to eliminate this drawback. Thus it is a primary object of the present invention to provide a battery apparatus which functions properly even when the battery charger is removed with the rechargeable battery pulse charging switching device in the off state.

The above and further objects and features of the invention will more fully be apparent from the following detailed description with accompanying drawings.

SUMMARY OF THE INVENTION

The battery apparatus of the present invention is provided with circuitry to turn a switching device off and suspend charging when rechargeable battery voltage exceeds a specified voltage, and to turn the switching device on and resume charging when battery voltage drops below the specified voltage. This circuitry turns the switching device on and off for pulse charging.

Further, the battery apparatus is provided with an override circuit which forces the switching device to the on state when a cut-off of charging voltage application to the rechargeable battery is detected. This configuration of battery apparatus forces the switching device to the on state if the rechargeable battery is removed from the battery charger with the switching device for pulse charging the battery in the off state. This allows proper operation at all times.

Still further, it is desirable for the battery apparatus of the present invention to be provided with a forced discharge circuit to forcibly discharge the rechargeable battery until battery voltage drops below the specified voltage when battery charging voltage cut-off is detected. When the forced discharge circuit discharges the rechargeable battery and battery voltage drops below the specified voltage, the switching device turns on.

DETAILED DESCRIPTION OF THE INVENTION

Figure 3:
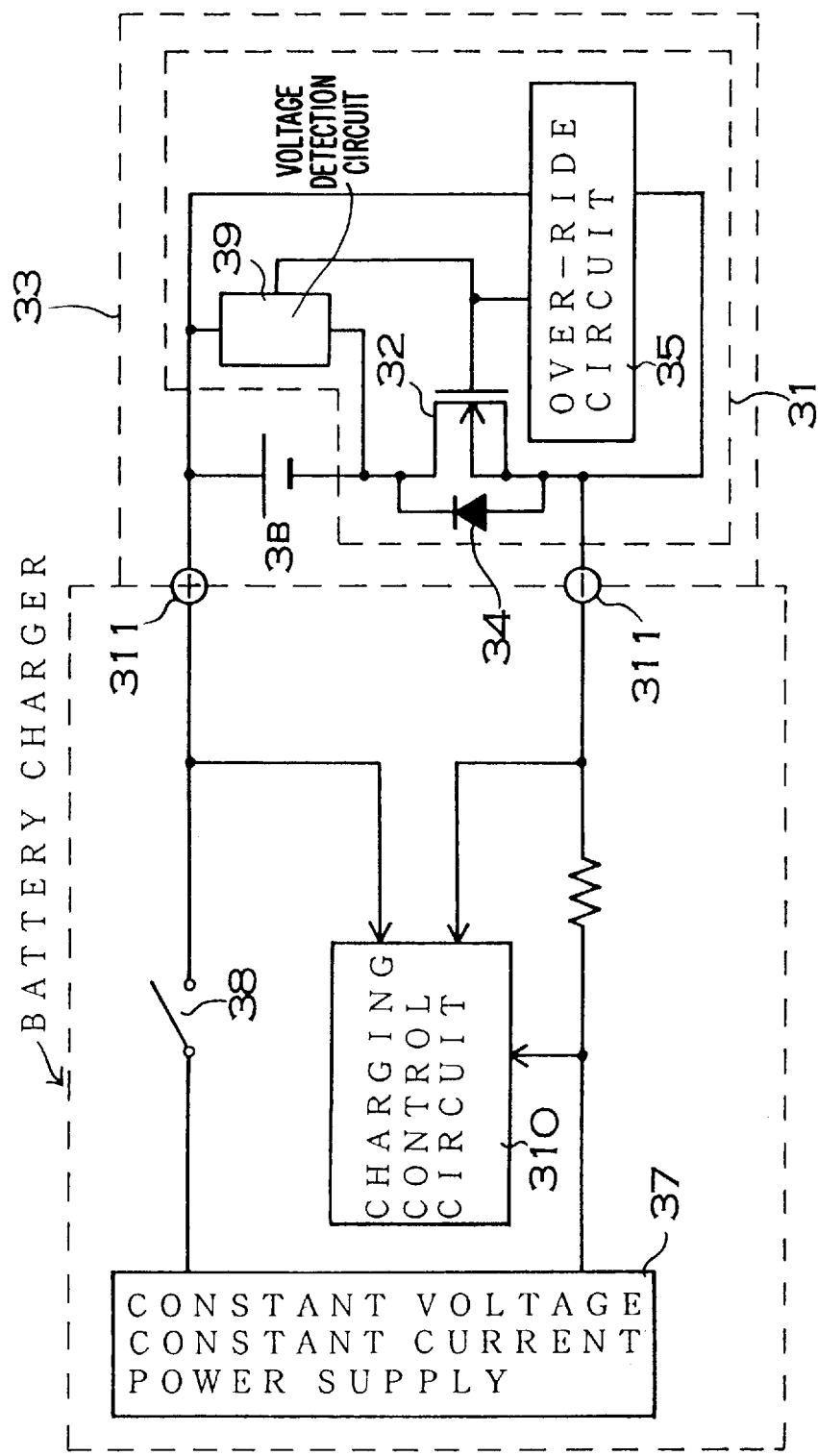
FIG. 3 is a block diagram of the first embodiment of the present invention.

Turning to FIG. 3, a battery pack 33 is shown which is the battery apparatus of a first embodiment of the present invention. The battery pack 33 houses a lithium ion rechargeable battery (henceforth, rechargeable battery) 3B and a protection circuit 31. The battery charger for charging the battery pack 33 is provided with a constant voltage constant current power supply 37 which converts commercial power input into output voltage and current suitable for charging rechargeable battery 3B, a rapid charging switch 38 connected to the output side of the constant voltage constant current power supply 37, and a charging control circuit 310 which controls the rapid charging switch 38.

The constant voltage-constant current power supply 37 is set, for example, to output a regulated voltage of 4.3V/cell. The output current is set, for example, to a current capable of charging at 1 C to 2 C. The rapid charging switch 38 is switched on when rapidly charging the rechargeable battery 3B and is off at all other times.

The charging control circuit 310 turns the rapid charging switch 38 on for rapid charging of the rechargeable battery 3B housed in the battery pack 33 and switches it off when the rechargeable battery 3B is fully charged.

The battery pack 33 contains a protection circuit 31. The protection circuit 31 measures rechargeable battery 3B voltage and suspends charging if battery voltage becomes greater than a specified voltage. The protection circuit 31 is provided with a switching device 32 connected in series with the rechargeable battery 3B, a voltage detection circuit 39 which measures battery voltage and controls the switching device 32, and an over-ride circuit 35 which forces the switching device 32 to the on state when the battery pack 33 is removed from the battery charger with the switching device 32 in the off state.

The voltage detection circuit 39 turns the switching device 32 off if battery voltage exceeds the specified voltage. However, when battery voltage exceeds the specified voltage, the voltage detection circuit 39 does not immediately turn the switching device 32 off. When battery voltage exceeds the specified voltage, the switching device 32 is turned off after a fixed time interval has passed. The rechargeable battery 3B is pulse charged during the short time interval from the time the battery voltage exceeds the specified voltage until the switching device 32 is turned off. The pulse charging tine of rechargeable battery 3B is regulated by the switch off time of the switching device 32. After the switching device 32 turns off, the rechargeable battery 3B is no longer charged and the open circuit battery voltage gradually decreases. The voltage detection circuit 39 measures the decreasing open circuit battery voltage, and once again turns the switching device 32 on when the open circuit battery voltage drops below the specified voltage. This charging is performed repeatedly to charge the rechargeable battery 3B via pulse charging.

The over-ride circuit 35 detects removal of the battery pack 33 from the battery charger and switches the switching device 32 from the off state to the on state. When the battery pack 33 is removed from the battery charger with the switching device 32 in the off state, voltage between the positive and negative output terminals 311 of the battery pack 33 drops by 0.6V. This voltage drop is due to a parasitic diode 34 of the switching device 32 in series with the rechargeable battery 3B. The over-ride circuit 35 detects the voltage drop at the battery pack 33 output terminals and turns the switching device 32 on.

Figure 4:
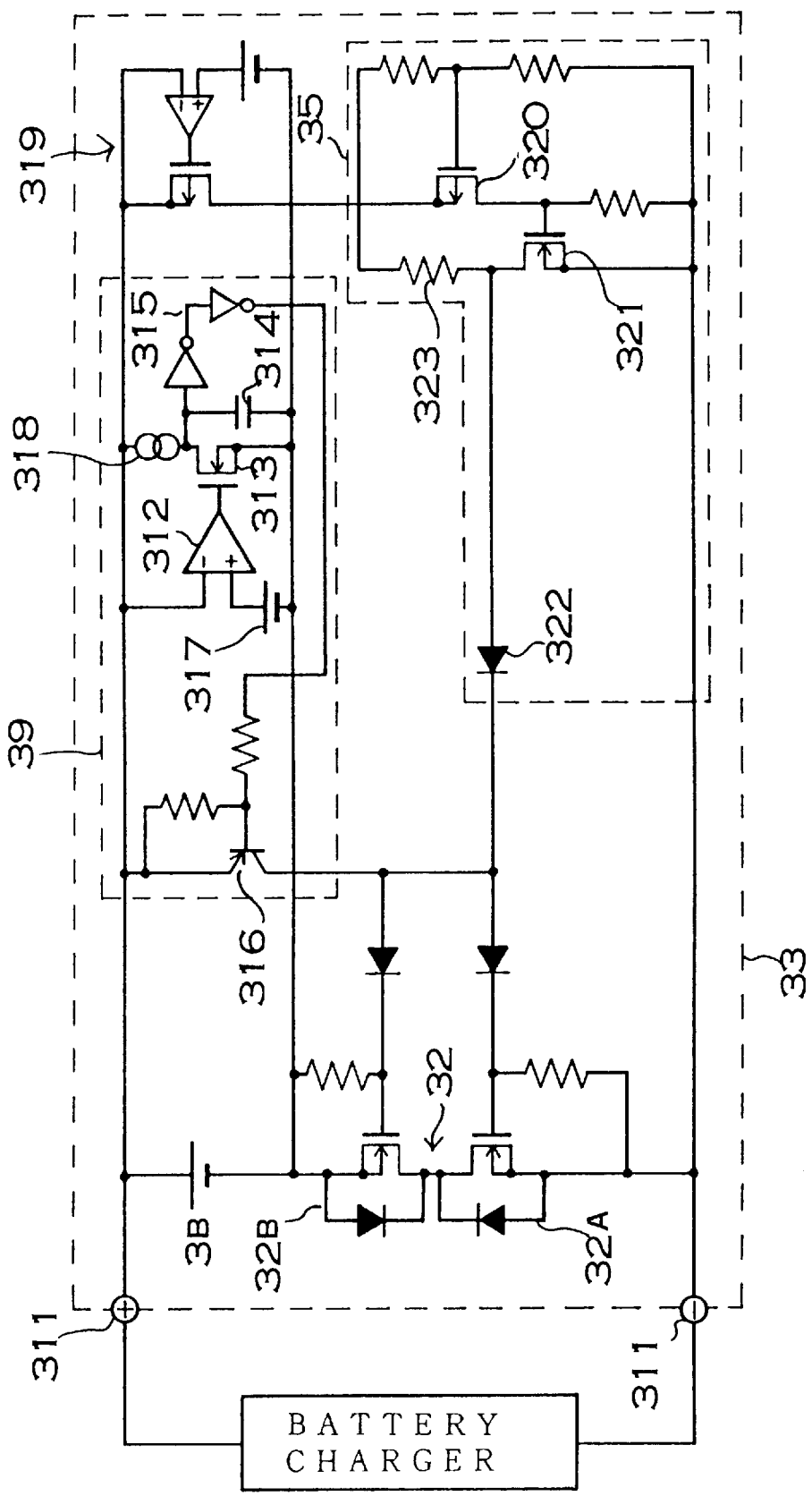
FIG. 4 is a detailed circuit diagram of the block diagram shown in FIG. 3.

FIG. 4 is a circuit diagram of a concrete example of the battery pack 33 shown in FIG. 3. The voltage detection circuit 39 in this battery pack 33 is made up of a field effect transistor (FET) 313 connected at the output of a comparitor 312, a timing capacitor 314 connected at the output of the FET 313, two stages of inverting amplifiers 315 to amplify the timing capacitor 314 voltage, and a bipolar transistor 316 controlled on or off by the output of the inverting amplifiers 315. A reference voltage 317 is connected to the non-inverting input of the comparitor 312. The FET 313 connected to the comparitor 312 is also connected to a constant current source 318 circuit. In addition, the switching device 32 is made up of two FET's 32A and 32B connected together with opposing polarities.

The voltage detection circuit 39 pulse charges the rechargeable battery 3B by controlling the switching device 32 on and off according to the following. When rechargeable battery 3B voltage is less than the reference voltage 317 (for example, 4.20V), the voltage at the inverting input of the comparitor 312 is less than that at the non-inverting input and the comparitor 312 outputs a high ("H") signal. The "H" signal from the comparitor 312 turns on the FET 313 short circuiting across the terminals of the timing capacitor 314.

Voltage at both terminals of the shorted timing capacitor 314 is low ("L"). This "L" signal is amplified by the inverting amplifiers 315 controlling the pnp transistor 316 to be on. Transistor 316 in the on state provides bias voltage to the gates of the two FET's 32A and 32B putting the switching device 32 in the on state.

In this manner, when battery voltage is less than the specified voltage, the switching device 32 is switched to the on state. Similarly, when the rechargeable battery 3B gets charged and battery voltage becomes greater than the specified voltage, the switching device 32 is switched to the off state according to the following.

When the inverting input voltage of the comparitor 312 becomes greater than the non-inverting input voltage, the comparitor 312 issues an "L" signal. The "L" signal output from the comparitor 312 turns the FET 313 off and timing capacitor 314 voltage gradually rises as the capacitor is charged by the current source 318. The rate of voltage rise in the timing capacitor 312 is determined by the capacitance of the timing capacitor 312 and the supplied current from the current source 318.

When the voltage across the timing capacitor 312 terminals exceeds a threshold level, the output from the inverting amplifiers 315 goes from "L" to "H" turning off transistor 316. Transistor 316 in the off state no longer provides bias voltage to the gates of the switching device 32 turning both FET's 32A and 32B off.

The over-ride circuit 35 detects removal of the battery pack 33 from the battery charger with the switching device 32 in the off state, and turns the switching device 32 on. The over-ride circuit 35 is provided with a p-channel FET 320 with its source and drain connected through a power saving circuit 319 to the positive and negative terminals respectively of the battery pack 33, an n-channel FET 321 with its gate connected to the drain of the p-channel FET 320, and an output diode 322 connected to the drain of the n-channel FET 321. A bias resistor 323 connected to the drain of the n-channel FET 321 turns the FET's 32A and 32B of the switching device 32 on when the n-channel FET 321 turns off.

The power saving circuit 319 activates the over-ride circuit 35 when battery voltage is above a certain specified voltage (for example, 4.00V) to reduce undesired consumption of current from the rechargeable battery 3B.

The over-ride circuit 35 turns the switching device 32 on in the following manner when the battery pack 33 is removed from the battery charger. When the battery pack 33 is removed from the battery charger, the p-channel FET 320 and the n-channel FET 321 turn off applying bias voltage to the gates of the switching device 32 FET's 32A and 32B. The switching device 32 is turned on by this action.

Conversely, when the battery pack 33 is connected to the battery charger, the p-channel FET 320 and the n-channel FET 321 are in the on state, and no bias voltage is applied to turn on the switching device 32. Consequently, when the battery pack 33 is connected to the battery charger, the over-ride circuit 35 does not force the switching device 32 to the on state, and the switching device 32 is controlled-on and off by the voltage detection circuit 39 to pulse charge the rechargeable battery 3B.

Figure 5:
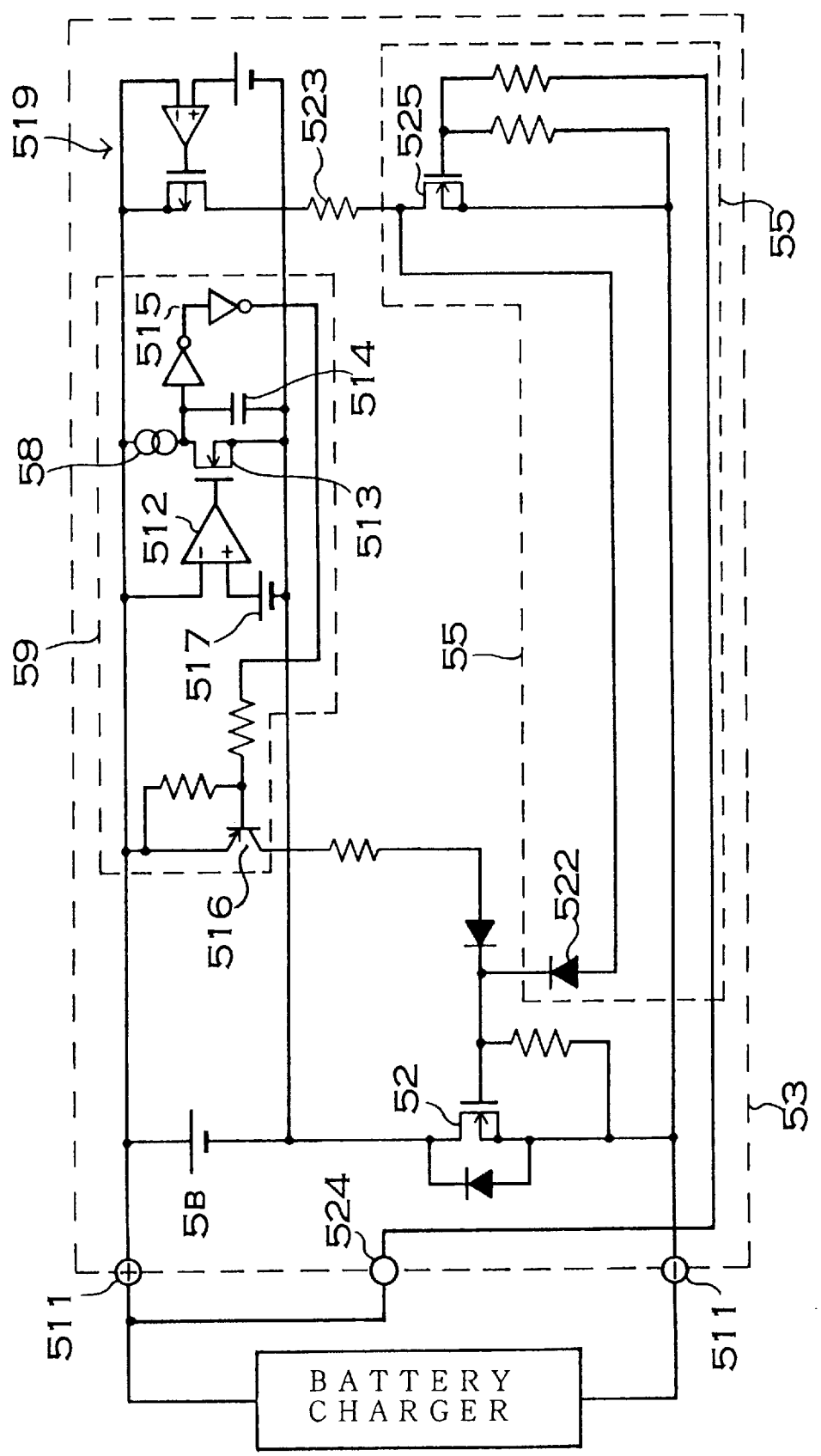
FIG. 5 is a circuit diagram of the second embodiment of the present invention.

FIG. 5 is a second embodiment of the present invention showing a battery pack 53 having a control terminal 524. This battery pack 53 has a control FET 525 connected to its control terminal 524. The control FET 525 is turned off and on by Voltage input to the control terminal 524. The drain of the control FET 525 is connected through an output diode 522 to the gate of a switching device 52 FET.

This over-ride circuit 55 maintains the control FET 525 in the on state when the battery pack 53 is connected to the battery charger, and switches the control FET 525 to the off state when the battery pack 53 is removed from the battery charger. When the control FET 525 is in the on state, no bias voltage is applied to the FET which makes up the switching device 52. When the battery pack 53 is removed from the battery charger and the control FET 525 is switched to the off state, bias voltage is applied to the gate of the switching device 52 forcing it to the on state.

Figure 6:
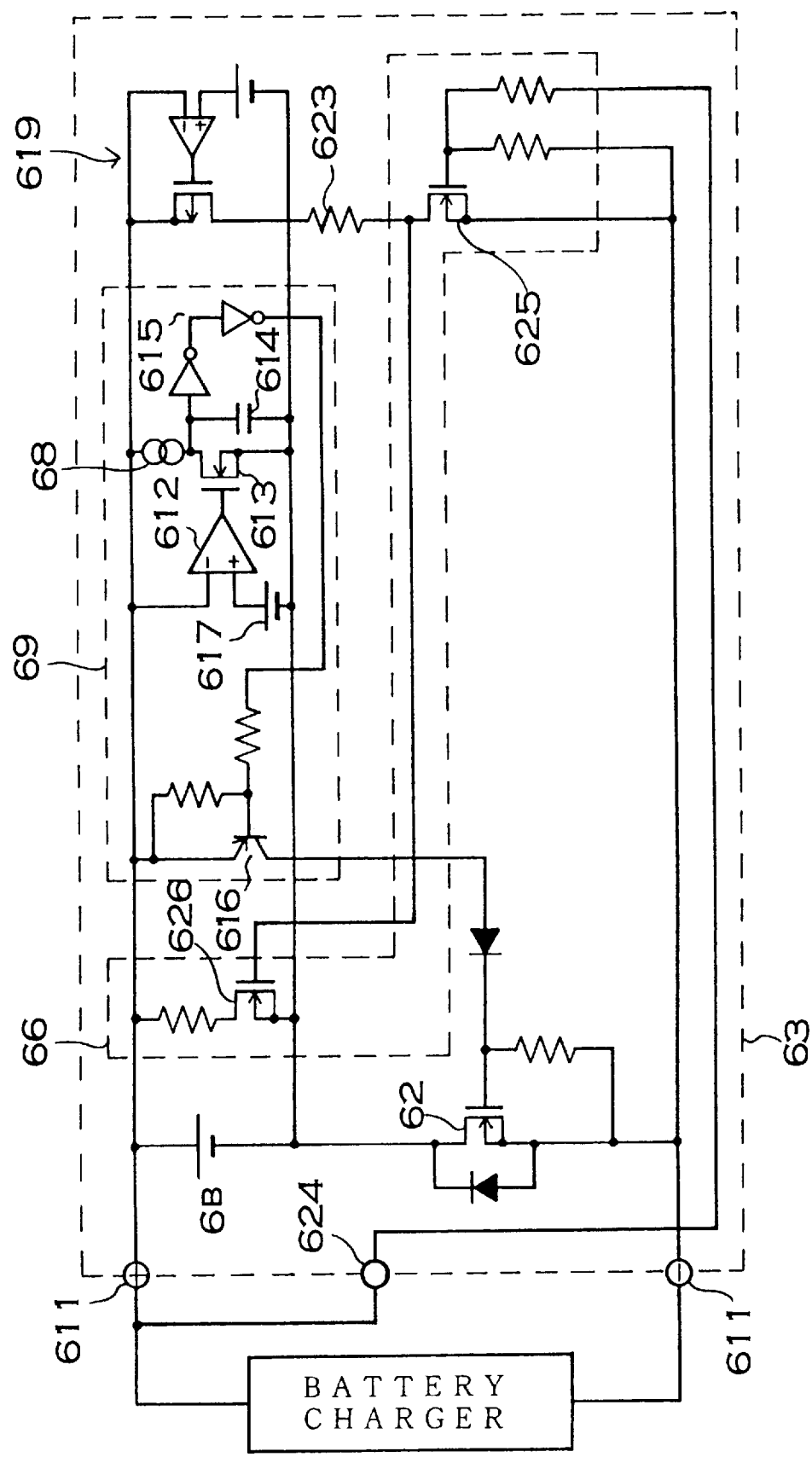
FIG. 6 is a circuit diagram of the third embodiment of the present invention.

Turning to FIG. 6, a third embodiment of the present invention is shown. The battery pack 63 shown in FIG. 6 contains a forced discharge circuit 66 which discharges the rechargeable battery 6B and turns the switching device 62 on when the battery pack 63 is removed from the battery charger. The forced discharge circuit 66 shown in FIG. 6 is provided with a control FET 625 connected to a control terminal 624 in the same fashion as the over-ride circuit 55 shown in FIG. 5, and a discharge FET 626 which is turned on and off by the control FET 625.

The control FET 625 is in the on state when the battery pack 63 is attached and voltage is input from the control terminal 624. The control FET 625 goes to the off state when the battery pack 63 is removed from the battery charger and voltage is not input from the control terminal 624. When the control FET 625 is in the on state, no bias voltage is applied to the gate of the discharge FET 626. When the battery pack 63 is removed from the battery charger and the control FET 625 switches to the off state, bias voltage is applied to the gate of the discharge FET 626 and the discharge FET 626 is forced to the on state. When the discharge FET 626 is on, the rechargeable battery 6B discharges and its voltage drops. When battery voltage drops to the specified voltage, the voltage detection circuit 69 turns the switching device 62 on.

A signal to turn the control FET 625 off may also be issued from the control terminal 624 when the rapid charging switch (refer to 38 in FIG. 3) goes to the off state.

Figure 7:
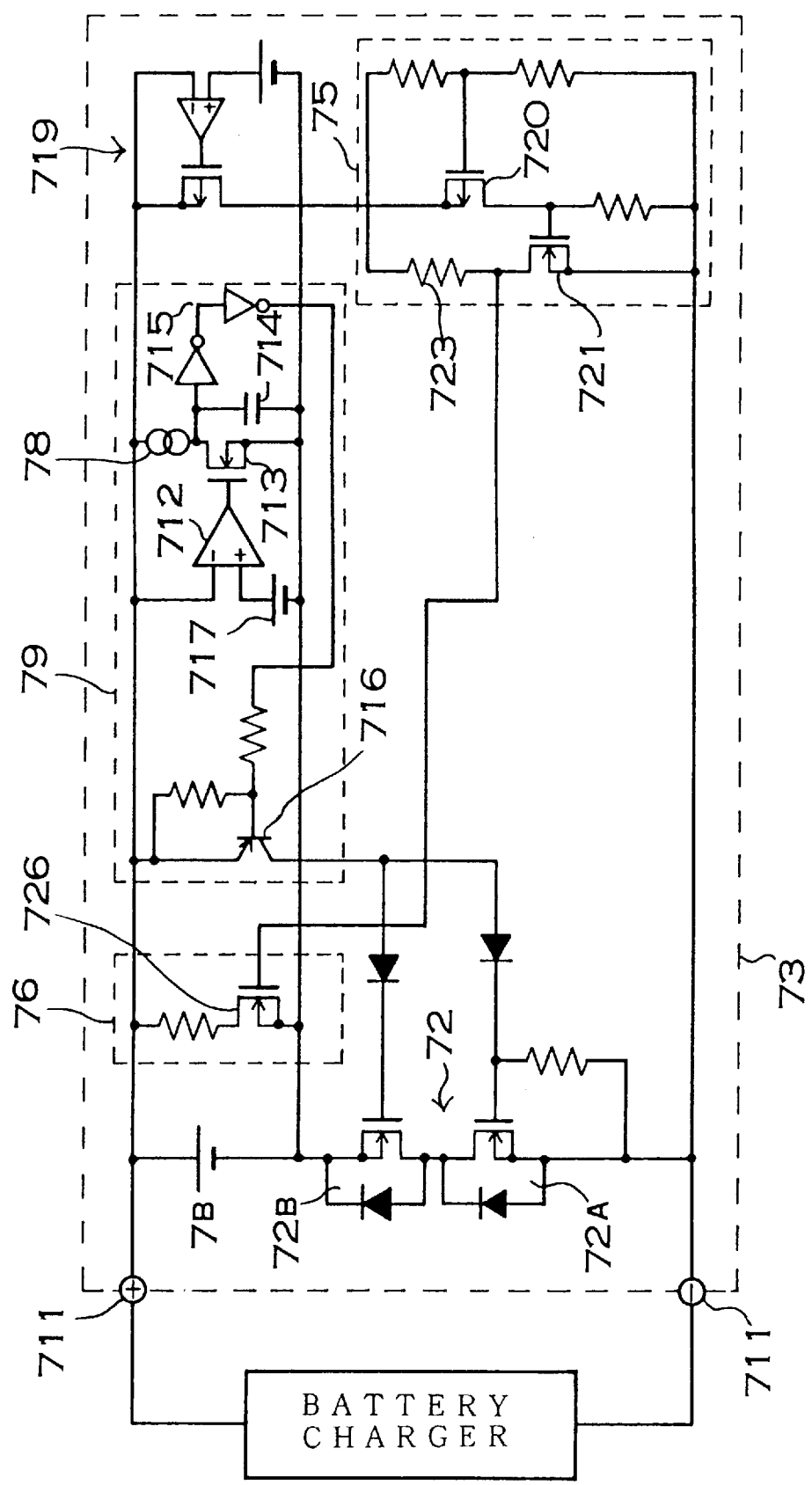
FIG. 7 is a circuit diagram of the fourth embodiment of the present invention.

Turning to FIG. 7, a fourth embodiment of the present invention is shown. In the battery pack 73 shown in FIG. 7, the discharge FET 726 is controlled by a circuit analogous to the p-channel FET 320 and the n-channel FET 321 shown in FIG. 4. When the battery pack 73 is removed from the battery charger, the p-channel FET 720 and the n-channel FET 721 turn off. As a result, the discharge FET 726 turns on and the rechargeable battery 7B discharges. Battery voltage gradually drops, and when battery voltage drops to the specified voltage, the voltage detection circuit 79 turns the switching device 72 on.

When the battery pack 73 is connected to the battery charger, the p-channel FET 720 and the n-channel FET 721 are in the on state and the discharge FET 726 does not turn on. For this reason, the over-ride circuit 75 does not turn the discharge FET 726 on with the battery pack 73 attached to the battery charger.

Figure 8:
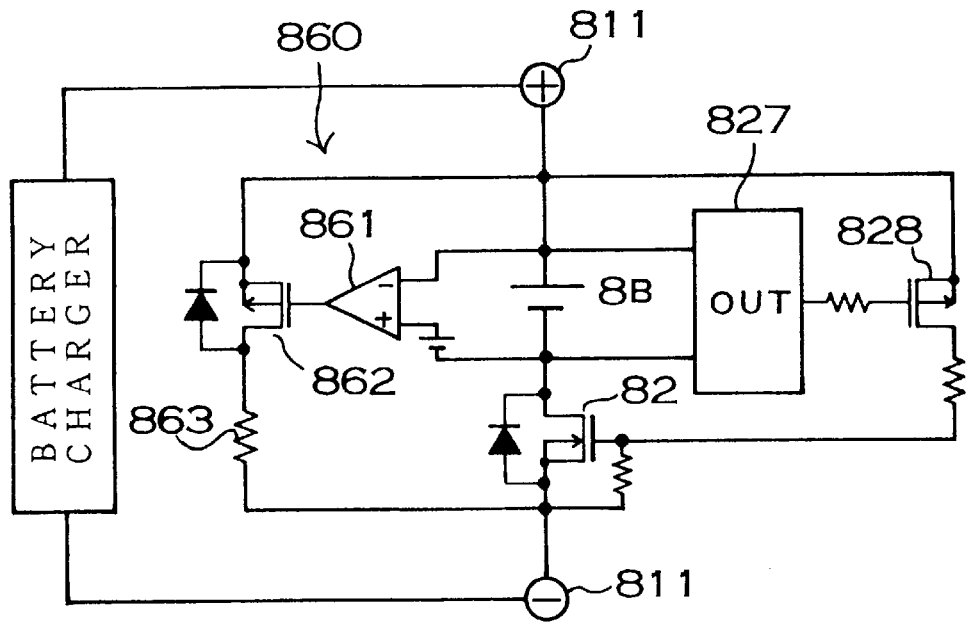
FIG. 8 is a circuit diagram of the fifth embodiment of the present invention.

Turning to FIG. 8, a fifth embodiment of the present invention is shown. A pulse control circuit 827 pulse charges the rechargeable battery 8B by operating in the same manner as the voltage detection circuit 39 shown in FIG. 4. Specifically, when rechargeable battery 8B voltage is less than a specified voltage (for example, 4.20V), the pulse control circuit 827 issues an "L" signal from the output terminal OUT. This turns on a pulse control FET 828 which in turn switches the switching device 82 to the on state. Conversely, when the rechargeable battery 8B charges and its voltage becomes greater than the specified voltage, an "H" signal is issued from the output terminal OUT. As a result, the pulse control FET 828 turns off and the switching device 82 switches to the off state.

In addition, this embodiment is provided with a forced discharge circuit 860 of a different type than that of FIG. 6. This forced discharge circuit 860 is made up of a comparitor 861 which compares rechargeable battery 8B voltage with a specified voltage (for example, 4.00V), a control FET 862 which is turned on and off by the output from the comparitor 861, and a discharge resistor 863 connected in series with the control FET 862. The series connected control FET 862 and discharge resistor 863 are in turn connected between the positive terminal of the rechargeable battery 8B and the source of the switching device 82 FET.

Note that it is not necessary to provide for the operation of the forced discharge circuit 860 during the period that rechargeable battery 8B voltage is greater than the specified voltage.

When the battery pack 83 is removed from the battery charger, the rechargeable battery 8B discharges through the control FET 862, the discharge resistor 863, and the parasitic diode of the switching device 82. When battery voltage drops to the specified voltage, the pulse control circuit 827 detects this and turns the switching device 82 on.

Figure 9:
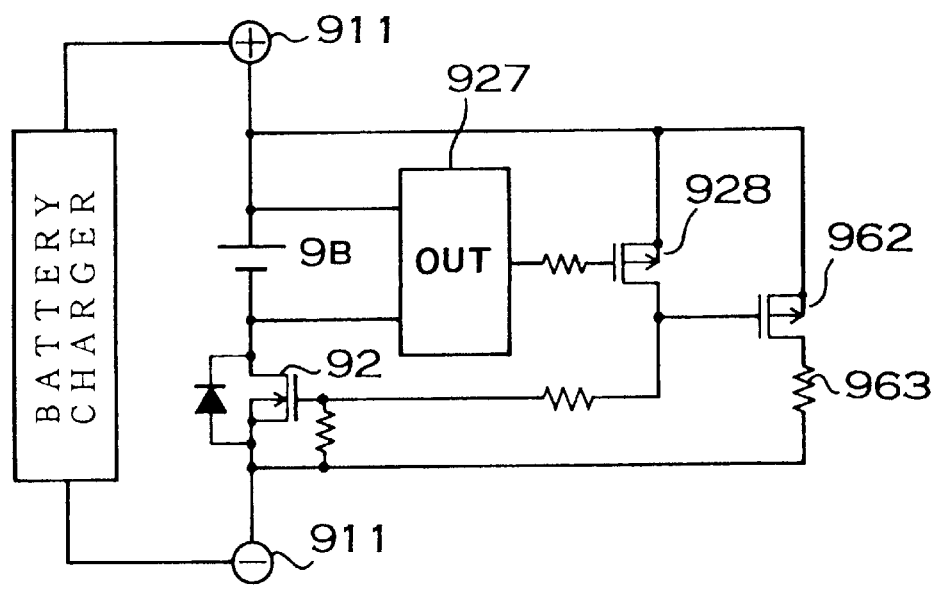
FIG. 9 is a circuit diagram of the sixth embodiment of the present invention.

Turning to FIG. 9, a sixth embodiment of the present invention is shown. In this embodiment, the forced discharge circuit analogous to 860 of FIG. 8 has the gate of a control FET 962 connected to the drain of a pulse control FET 928. In this circuit structure, when the switching device 92 is in the off state, that is when the pulse control FET 928 is in the off state, the control FET 962 is in the on state. Therefore, when the battery pack 93 is removed from the battery charger, the rechargeable battery 9B discharges through the control FET 962, the discharge resistor 963, and the parasitic diode of the switching device 92. When battery voltage drops to the specified voltage, the pulse control circuit 927 detects this and turns the switching device 92 on.

Figure 10:
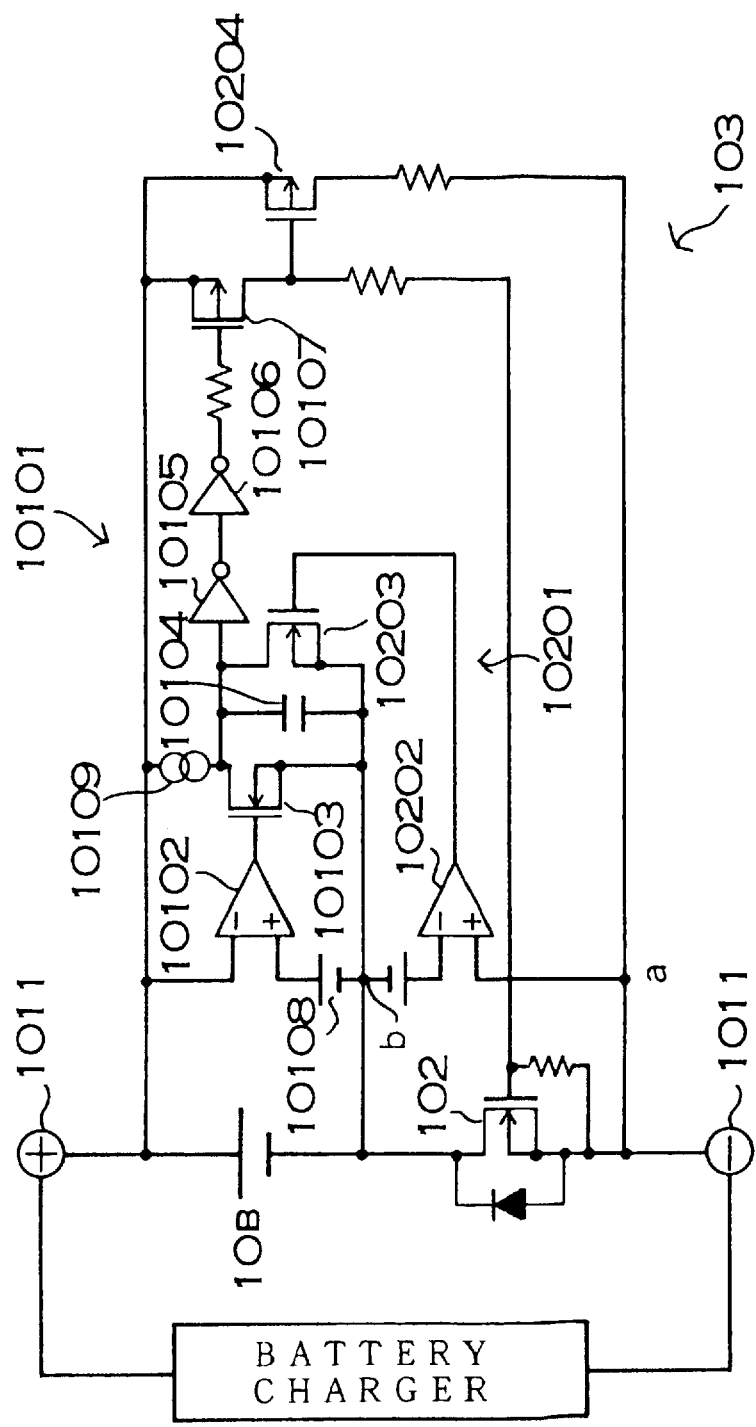
FIG. 10 is a circuit diagram of the seventh embodiment of the present invention.

Turning to FIG. 10, a seventh embodiment of the present invention is shown. The battery pack 103 of this embodiment is provided with a pulse control circuit 10101 and an over-ride circuit 10201. The pulse control circuit 10101 is made up of a comparator 10102, an FET 10103 connected at the output of the comparator 10102, a timing capacitor 10104 connected at the output of the FET 10103, two inverting amplifiers 10105 and 10106 to amplify the timing capacitor 10104 voltage, and a transistor 10107 controlled on or off by the output of the inverting amplifier 10106. A reference voltage 10108 is connected to the non-inverting input of the comparator 10102. The FET 10103 connected to the comparator 10102 is also connected to a constant current source 10109 circuit. A detailed description of this pulse control circuit 10101 is omitted since it is similar to the operation of the previously described voltage detection circuit 39 of FIG. 4.

The over-ride circuit 10201 is made up of a comparator 10202 which compares the voltage at point a with the voltage at point b (through a reference voltage source of 0.2V), a control FET 10203 which is connected in parallel with the timing capacitor 10104 and which is turned on and off by the comparator 10202 output, and a control FET 10204 which is turned on and off by the transistor 10107. The gate and source of the control FET 10203 may also be connected between the comparator 10202 output terminal and a ground terminal.

While the battery pack 103 is connected to the battery charger, the point a voltage at the non-inverting input of the comparator 10202 is always lower than the point b voltage at the inverting input of the comparator 10202. In this case, the control FET 10203 is not turned on. Consequently, the switching device 102 is control led according to pulse control circuit 10101 operation.

However, when the switching device 102 is off (namely, when transistor 10107 is off) and the battery pack 103 is removed from the battery charger, discharge current flows from the rechargeable battery 10B through the control FET 10204 and the parasitic diode of the switching device 102. As a result of this discharge current, the voltage at point a rises above the voltage at point b and the comparator 10202 outputs an "H" signal. This "H" signal turns on the control FET 10203 which discharges the timing capacitor 10104. Consequently, transistor 10107 is turned on forcing the switching device 102 to the on state.

Figure 11:
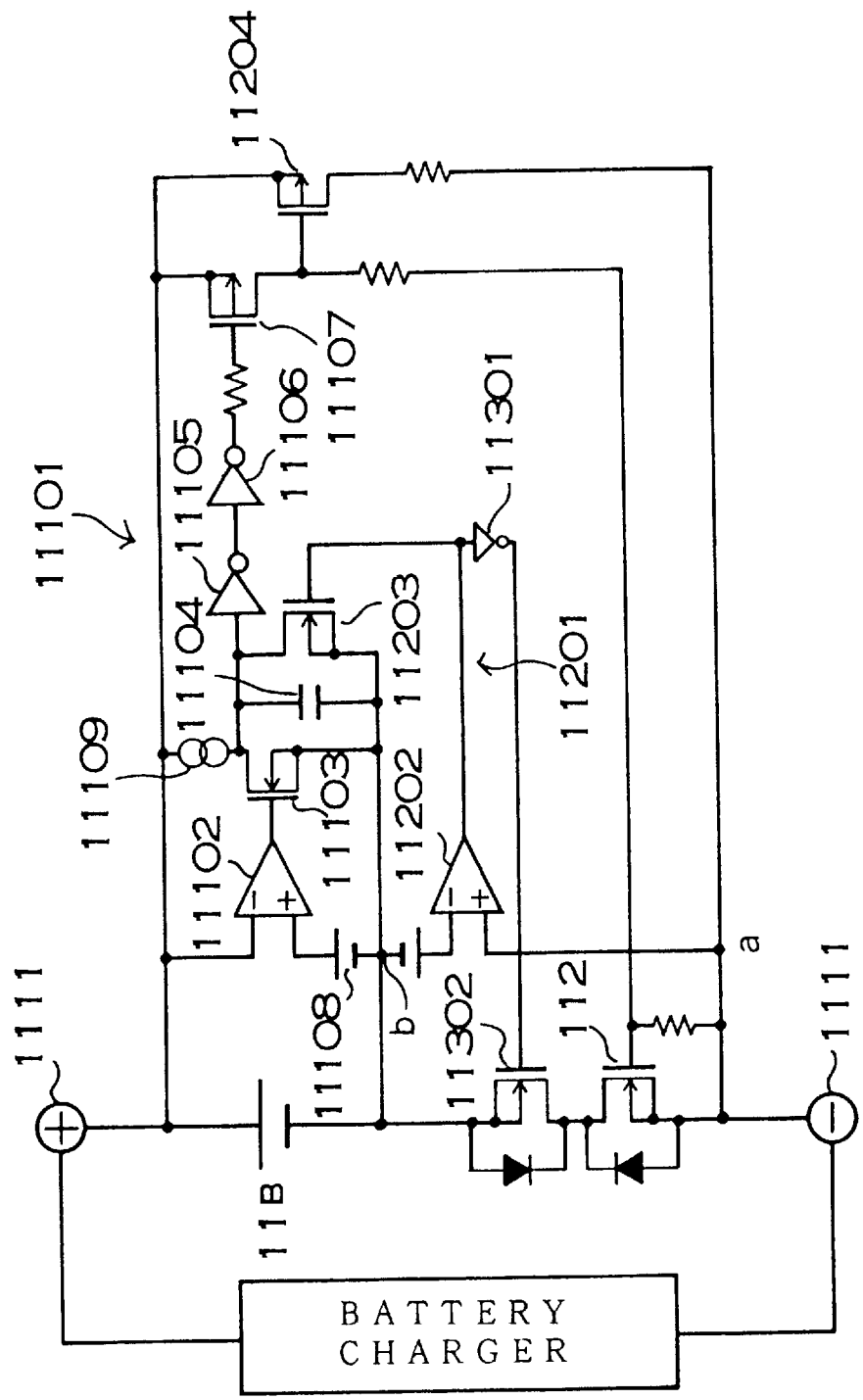
FIG. 11 is a circuit diagram of the eighth embodiment of the present invention.

Turning to FIG. 11, an eighth embodiment of the present invention is shown which is a variation of the previously described seventh embodiment. This embodiment is basically the circuit of FIG. 10 with an inverting amplifier 11301 to invert the output of the comparator 10202 of FIG. 10 and an over-current protection switching device metal oxide semiconductor FET (MOSFET) 11302 connected with opposing polarity in series with the switching device 112 and controlled by the inverting amplifier 11301.

In this circuit configuration, when the rechargeable battery 11B is subjected to a high current discharge, the voltage at point a becomes larger than the voltage at point b, the comparator 11202 output becomes "H", and the inverting amplifier 11301 outputs an "L" signal. As a result, the over-current protection switching device 11302 goes to the off state and the over-current discharge of rechargeable battery 11B is interrupted.

Figure 12:
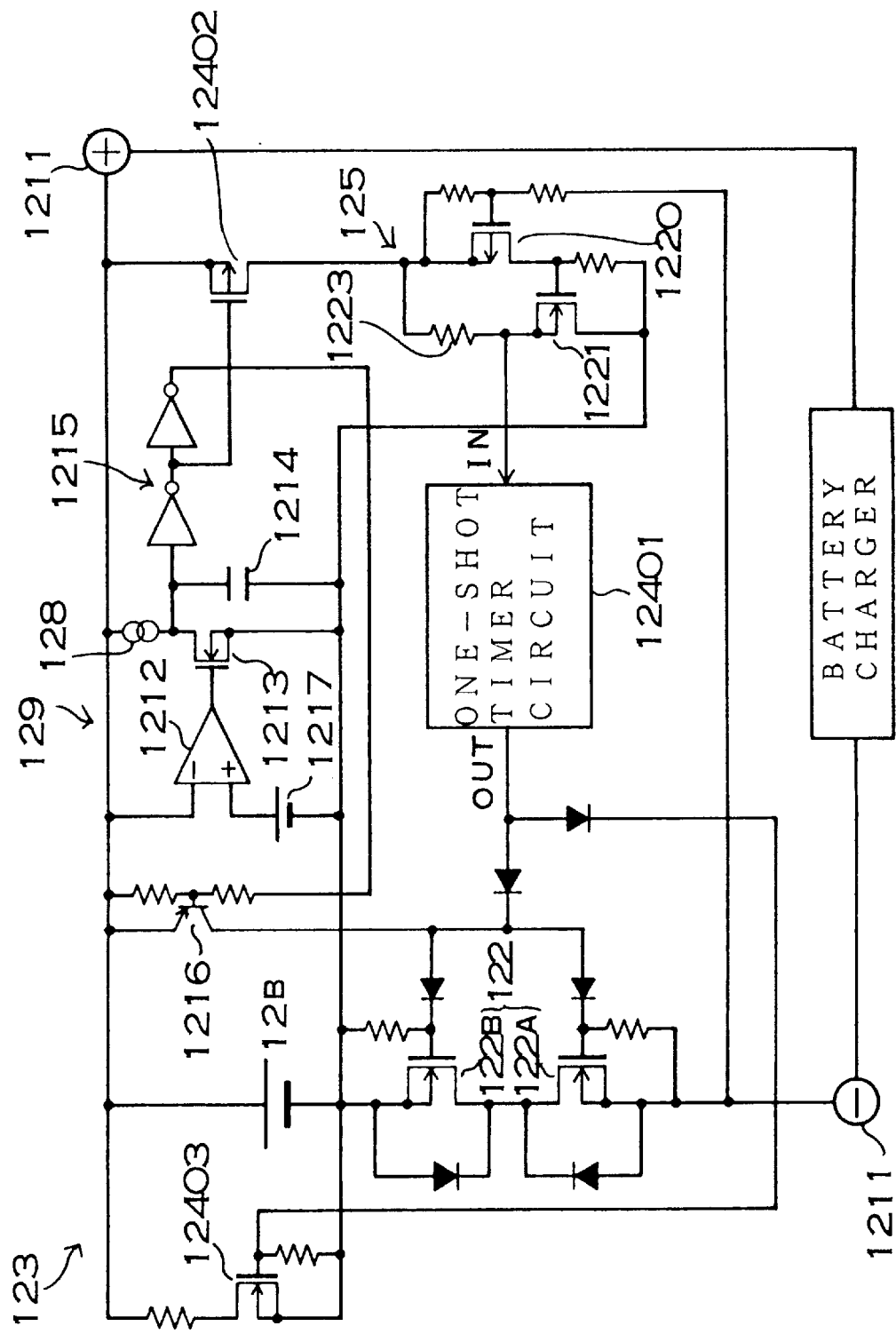
FIG. 12 is a circuit diagram of the ninth embodiment of the present invention.

Turning to FIG. 12, a ninth embodiment of the present invention is shown. This embodiment is a variation which improves the first embodiment shown in FIG. 4.

Figure 1:
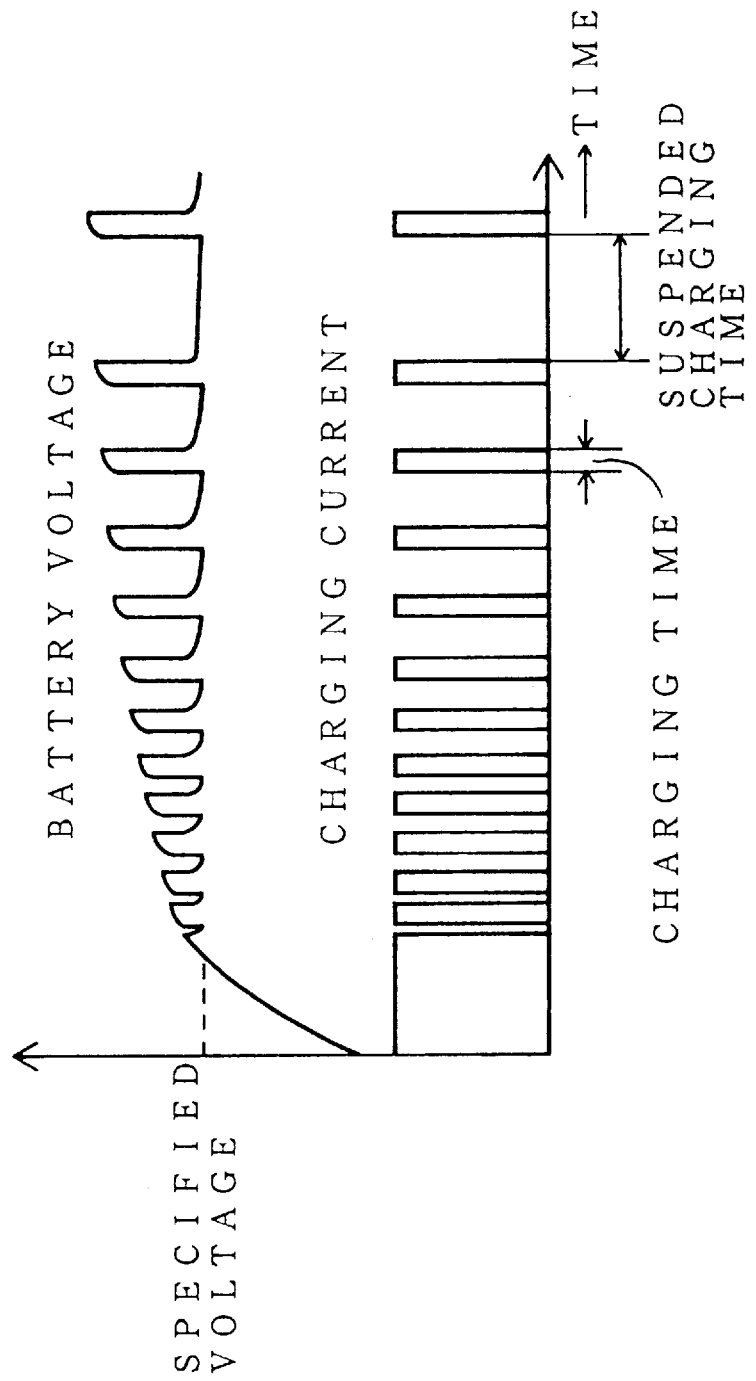
FIG. 1 is a graph showing battery voltage and charging current characteristics during pulse charging of a rechargeable battery.
Figure 2:
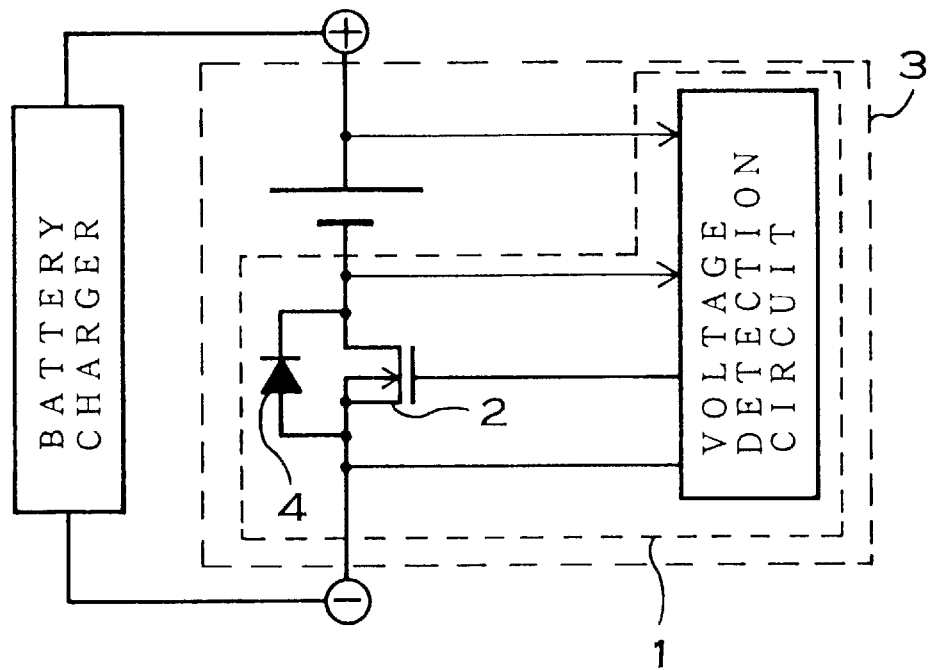
FIG. 2 is a circuit diagram of a prior art embodiment.

Before describing the ninth embodiment, a problem which can possibly occur with the first embodiment will be described. As shown in FIG. 1 for the case where the rechargeable battery 3B is pulse charged under control of the voltage detection circuit 39, the time period from switching off a pulse charge to voltage drop below the specified voltage becomes significantly long as full charge is approached.

Consider circuit operation when the battery pack 33 is removed from the battery charger during the time period where pulse charging is off but battery voltage has not yet dropped below the specified voltage. At the time the battery pack 33 is removed from the battery charger, the over-ride circuit 35 turns the switching device 32 on, but by doing this, the rechargeable battery 3B voltage appears across the battery pack 33 output terminals 311 and the over-ride circuit p-channel FET 320 and n-channel FET 321 turn on. This removes bias voltage to keep the switching device 32 on.

Meanwhile, since the rechargeable battery 3B voltage has not dropped below the specified voltage, the transistor 316 of the voltage detection circuit 39 is in the off state and no bias voltage is output to turn on the switching device 32.

Consequently, the switching device 32 is turned on once at the time the battery pack 33 is removed from the battery charger, but subsequently goes to the off state where it remains until battery voltage drops below the specified voltage.

Embodiment 9 shown in FIG. 12 is a system resulting from lessons learned from this problem. When the battery pack 123 is removed from the battery charger with pulse charging off but battery voltage not yet below the specified voltage, the over-ride circuit 125 detects battery pack 123 removal from the battery charger because transistor 12402 is in the on state. This changes the input IN of a one-shot timer circuit 12401 from "L" to "H". As a result, one-shot timer circuit 12401 output OUT becomes "H" for a fixed time period. Consequently, the switching device 122 is switched from off to on.

At the same time, the "H" OUT signal from the one-shot timer circuit 12401 turns a discharge control FET. 12403 on to forcibly discharge the rechargeable battery 12B. Discharge capacity is desirably set such that rechargeable battery 12B voltage will drop below the specified voltage during the time that the one-shot timer circuit 12401 is issuing an "H" output. Thus, even when one-shot timer circuit 12401 output becomes "L" after the fixed time period, rechargeable battery 12B voltage will have dropped below the specified voltage, voltage detection circuit 129 transistor 1216 will have turned on, and the switching device 122 will be maintained in the on state.

Note that a discharge control circuit including a discharge control FET 12403 is not always required. In the case that it is not included, the one-shot timer circuit 12401 repeatedly issues "H" signals until the rechargeable battery 12B voltage drops below the specified voltage. The practical result of this is that the switching device 122 is maintained in the on state.

Figure 13:
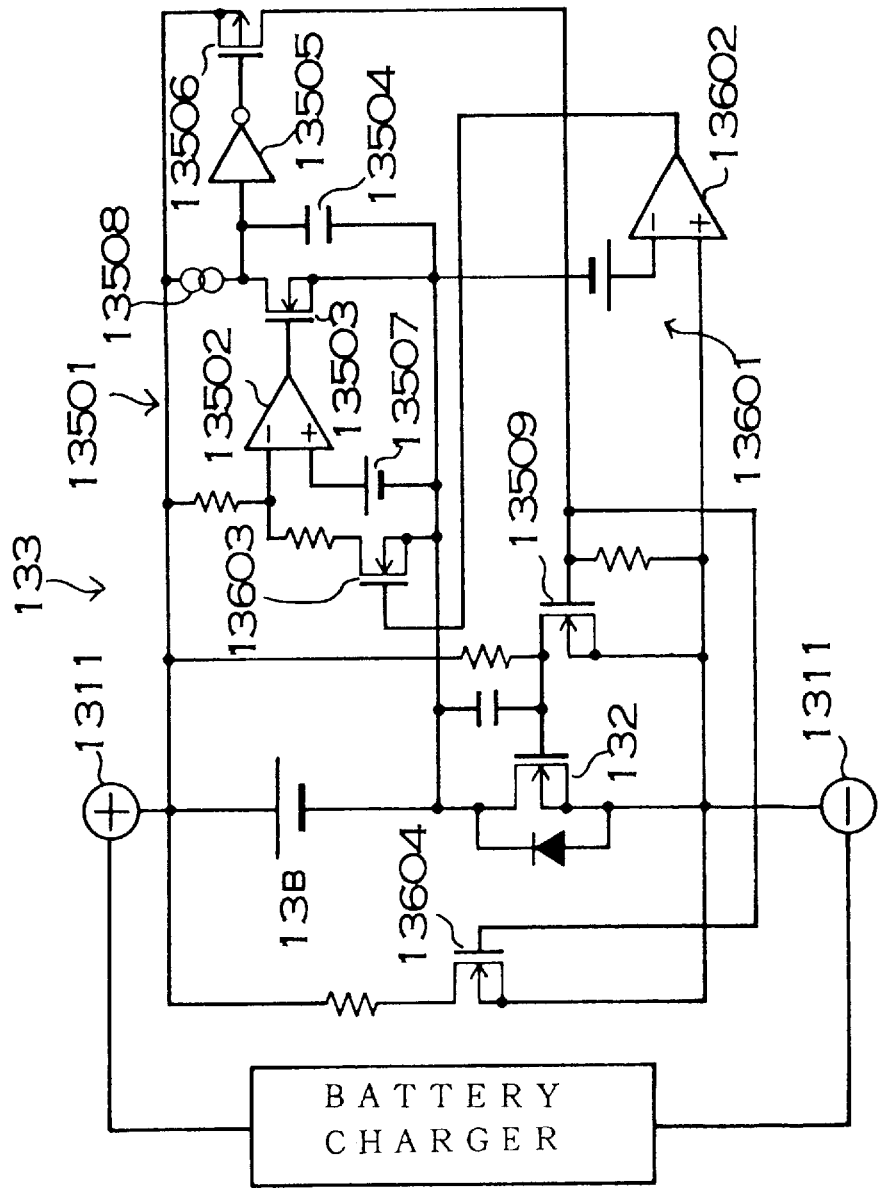
FIG. 13 is a circuit diagram of the tenth embodiment of the present invention.

Turning to FIG. 13, a tenth embodiment of the present invention is shown. The battery pack 133 of this embodiment is provided with a pulse control circuit 13501 and an over-ride circuit 13601. The pulse control circuit 13501 is provided with a comparitor 13502, an FET 13503 connected to the output of this comparitor 13502, a timing capacitor 13504 connected to the output of FET 13503, an inverting amplifier 13505 to amplify timing capacitor 13504 voltage, a transistor 13506 which is controlled on and off by output from the inverting amplifier 13505, a voltage reference 13507 connected to the comparitor 13502, a current source 13508 connected to the FET 13503 at the output of the comparitor 13502, and a transistor 13509 which is controlled on and off by output from transistor 13506. Since the operation of this pulse control circuit 13501 is practically the same as the previously described voltage detection circuit 39 of FIG. 4, its detailed description is omitted.

The over-ride circuit 13601 is provided with a comparitor 13602 which measures the voltage across the terminals of the switching device 132, an FET 13603 connected to the inverting input of comparitor 13502 and control led on and off by the output from comparitor 13602, and an FET 13604 which is controlled on and off by transistor 13506.

Since the non-inverting input voltage of the comparitor 13602 is always less than the inverting input voltage when the battery pack 133 is connected to the battery charger, the FET 13603 does not turn on. Consequently, the pulse control circuit 13501 functions normally turning the switching device 132 on and off controlling pulse charging according rechargeable battery 13B voltage.

On the other hand, when the battery pack 133 is removed from the battery charger with the switching device 132 in the off state, discharge current flows from the rechargeable battery 13B through the FET 13604 and the switching device 132 parasitic diode. The comparitor 13602 detects this discharge current and outputs an "H", signal which turns on FET 13603. As a result, the inverting input voltage of comparitor 13502 is a voltage divided fraction of the rechargeable battery 13B voltage and is less than the voltage reference 13507. This changes comparitor 13502 output from "L" to "H". Therefore, transistor 13506 goes to the off state and the switching device 132 is forced on.

In addition, FET 13604 also turns off when transistor 13506 goes to the off state. This interrupts discharge of the rechargeable battery 13B. Consequently, comparitor 13602 output goes to "L" and FET 13603 is turned off. At this point, when the rechargeable battery 13B voltage is still greater than the specified voltage, the pulse control circuit 13501 should again function to turn the switching device 132 off. However, when the switching device 132 goes off, rechargeable battery 13B discharge begins again and as previously described the switching device 132 is immediately forced on due to the over-ride circuit 13601.

As a result, when the battery pack 133 is removed from the battery charger, the switching device 132 repeatedly turns of and on while rechargeable battery 13B voltage is greater than the specified voltage. As a practical matter, the switching device 132 is effectively forced to the on state.

In this embodiment as well, a forced discharge circuit may be provided, and forced discharge may be performed to reduce rechargeable battery 13B voltage below the specified voltage.

Figure 14:
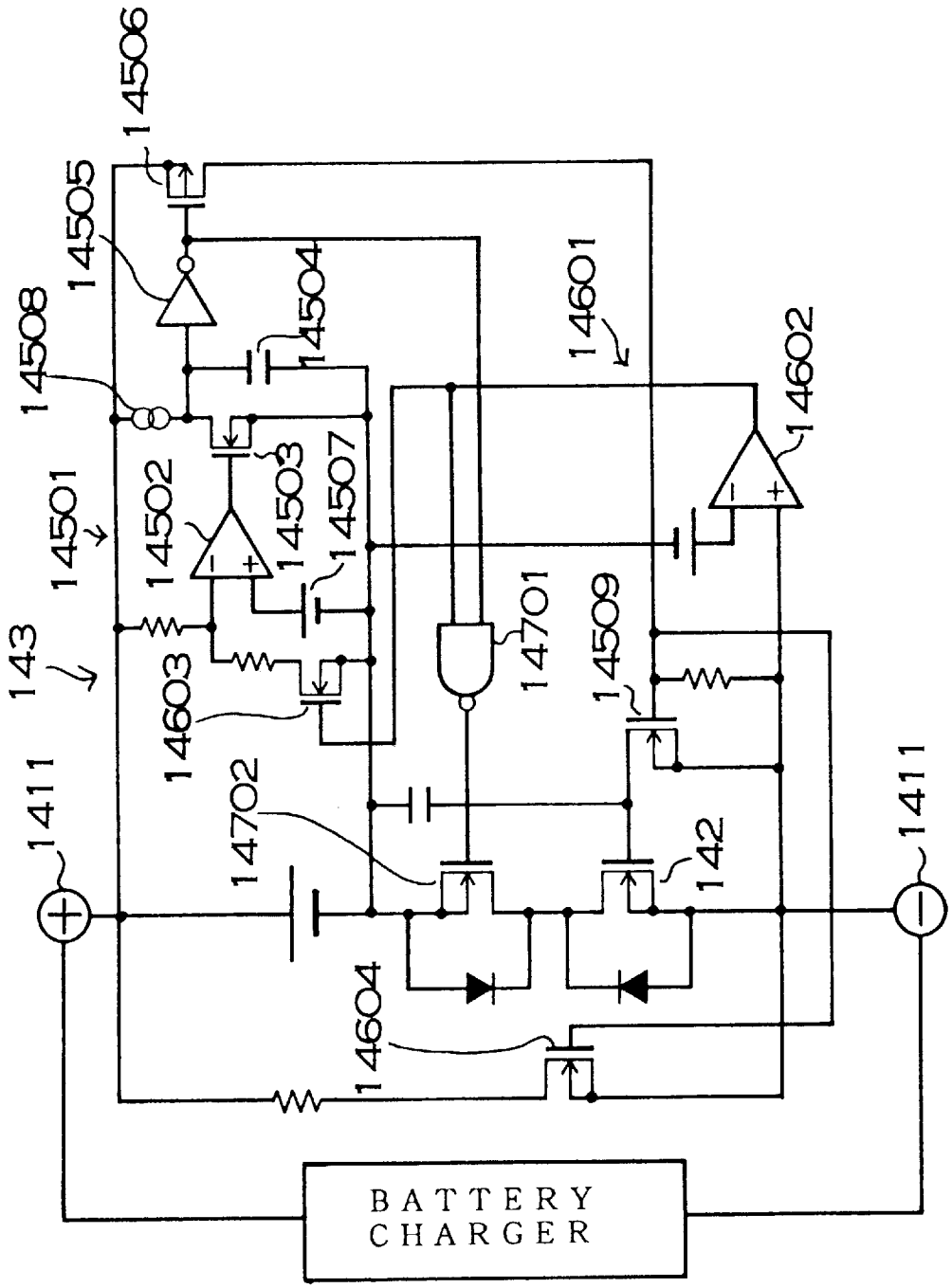
FIG. 14 is a circuit diagram of the eleventh embodiment of the present invention.

Turning to FIG. 14, an eleventh embodiment of the present invention is shown which is a variation of the tenth embodiment of FIG. 13. This embodiment is provided with a NAND logic gate 14701 which inputs inverting amplifier 14505 and comparitor 14602 outputs, and an over-current protection switching device MOSFET 14702 connected with opposing polarity in series with the switching device 142 and controlled by output from the NAND gate.

In this configuration, when the rechargeable battery 14B is subjected to a high current discharge, comparitor 14602 output goes to "H" and NAND gate 14701 output goes to "L"s. As a result, the over-current protection switching device 14702 goes to the off state and the rechargeable battery 14B high current discharge is interrupted.

Concerning interruption of a high current discharge, it should be clear that since inverting amplifier 14505 output is also input to the NAND gate 14701, the discharge is only interrupted when rechargeable battery 14B voltage is less than the specified voltage. Namely, discharge is only interrupted when the switching device 142 is in the on state. In other words, when the switching device 142 is off (that is when rechargeable battery 14B voltage is greater than the specified voltage), NAND gate output is "H" due to an "L" input from the output of inverting amplifier 14505 regardless of the output from comparitor 14602. Therefore, the over-current protection switching device 14702 will not turn off in this case.

As this invention may be embodied in many forms without departing from the spirit of essential characteristics thereof, the present embodiments are therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery apparatus comprising:
   (1) a switching device connected between a battery charger and a rechargeable battery;
   (2) a pulse control circuit to control on and off the switching device, the pulse control circuit turn off the switching device and suspend charging when rechargeable battery voltage exceeds a specified voltage, and turn on the switching device and resume charging when rechargeable battery voltage drops below the specified voltage; and
   (3) an over-ride circuit to detect a cut-off of charging voltage application to the rechargeable battery and to force the switching device on.

2. A battery apparatus as recited in claim 1 wherein the rechargeable battery is a lithium ion rechargeable battery.

3. A battery apparatus as recited in claim 1 wherein the battery apparatus contains a rechargeable battery protection circuit.

4. A battery apparatus as recited in claim 3 wherein the switching device is an FET contained in the rechargeable battery protection circuit.

5. A battery apparatus as recited in claim 3 wherein the pulse control circuit is a voltage detection circuit and is contained in the rechargeable battery protection circuit.

6. A battery apparatus as recited in claim 5 wherein the voltage detection circuit is a circuit which, when battery voltage exceeds the specified voltage, turns the switching device off after a fixed period of time.

7. A battery apparatus as recited in claim 3 wherein the over-ride circuit is contained in a rechargeable battery protection circuit.

8. A battery apparatus comprising:

(a) a battery charger to charge a rechargeable battery; and (b) a battery pack which attaches to the battery charger in a detachable manner including:

(1) a switching device connected between the battery charger and the rechargeable battery;

(2) a pulse control circuit to control on and off the switching device, the pulse control circuit turn off the switching device and suspend charging when rechargeable battery voltage exceeds a specified voltage, and turn on the switching device and resume charging when rechargeable battery voltage drops below the specified voltage; and (3) an over-ride circuit to detect a cut-off of charging voltage application to the rechargeable battery and to force the switching device on.

9. A battery apparatus as recited in claim 8 wherein the battery pack contains a protection circuit, and the protection circuit contains the switching device, the pulse control circuit, and the over-ride circuit.

10. A battery apparatus as recited in claim 8 wherein the rechargeable battery is a lithium ion rechargeable battery.

11. A battery apparatus as recited in claim 9 wherein the switching device is an FET.

12. A battery apparatus as recited in claim 9 wherein the pulse control circuit is a voltage detection circuit.

13. A battery apparatus as recited in claim 12 wherein the voltage detection circuit is a circuit which, when battery voltage exceeds the specified voltage, turns the switching device off after a fixed period of time.

14. A battery apparatus as recited in claim 9 wherein the over-ride circuit is a circuit to detect removal of the battery pack from the battery charger and to turn the switching device on.

15. A battery apparatus comprising:

(1) a switching device;

(2) a pulse control circuit to control on and off the switching device, the pulse control circuit turn off the switching device and suspend charging when rechargeable battery voltage exceeds a specified voltage, and turn on the switching device and resume charging when rechargeable battery voltage drops below the specified voltage; and (3) a forced discharge circuit to forcibly discharge the rechargeable battery until battery voltage drops below the specified voltage, when it detects a cut-off of charging voltage application to the rechargeable battery.

16. A battery apparatus as recited in claim 15 wherein the rechargeable battery is a lithium ion rechargeable battery.

17. A battery apparatus as recited in claim 15 wherein the battery apparatus contains a rechargeable battery protection circuit.

18. A battery apparatus as recited in claim 17 wherein the switching device is an FET contained in the rechargeable battery protection circuit.

19. A battery apparatus as recited in claim 17 wherein the pulse control circuit is a voltage detection circuit and is contained in the rechargeable battery protection circuit.

20. A battery apparatus as recited in claim 19 wherein the voltage detection circuit is a circuit which, when battery voltage exceeds the specified voltage, turns the switching device off after a fixed period of time.

21. A battery apparatus as recited in claim 15 wherein the forced discharge circuit is contained in a rechargeable battery protection circuit.

22. A battery apparatus comprising:

(a) a battery charger to charge a rechargeable battery; and (b) a battery pack which attaches to the battery charger in a detachable manner including:

(1) a switching device connected between the battery charger and the rechargeable battery;

(2) a pulse control circuit to control on and off the switching device, the pulse control circuit turn off the switching device and suspend charging when rechargeable battery voltage exceeds a specified voltage, and turn on the switching device and resume charging when rechargeable battery voltage drops below the specified voltage; and (3) a forced discharge circuit to forcibly discharge the rechargeable battery until battery voltage drops below the specified voltage, when it detects cut-off of charging voltage application to the rechargeable battery.

23. A battery apparatus as recited in claim 22 wherein the battery pack contains a protection circuit, and the protection circuit contains the switching device, the pulse control circuit, and the forced discharge circuit.

24. A battery apparatus as recited in claim 22 wherein the rechargeable battery is a lithium ion rechargeable battery.

25. A battery apparatus as recited in claim 22 wherein the switching device is an FET.

26. A battery apparatus as recited in claim 23 wherein the pulse control circuit is a voltage detection circuit.

27. A battery apparatus as recited in claim 22 wherein the voltage detection circuit is a circuit which, when battery voltage exceeds the specified voltage, turns the switching device off after a fixed period of time.

28. A battery apparatus as recited in claim 22 wherein the forced discharge circuit detects removal of the battery pack from the battery charger and forcibly discharges the rechargeable battery until battery voltage drops below the specified voltage.

* * * * *